Patented Mar. 5, 1929.

1,704,282

UNITED STATES PATENT OFFICE.

HANS T. CLARKE, OF NEW YORK, AND CARL J. MALM, OF ROCHESTER, NEW YORK, ASSIGNORS TO EASTMAN KODAK COMPANY, OF ROCHESTER, NEW YORK, A CORPORATION OF NEW YORK.

MIXED ORGANIC ESTERS OF CELLULOSE AND PROCESS OF MAKING THE SAME.

No Drawing. Application filed March 28, 1927, Serial No. 179,175. Renewed December 8, 1928.

This invention relates to mixed organic esters of cellulose, (that is to say, esters in which there are different organic acid groups). One object of the invention is to provide mixed organic esters which will have, in addition to the other properties desirable for films, filaments and varnishes, the properties of being soluble in acetone and of being insoluble in benzol. Another object is to provide such acetone-soluble esters which have the property of forming films and filaments possessing a permanent flexibility of a far higher order of magnitude than that hitherto obtained in nitrocellulose and acetyl cellulose films and filaments. Another object is to provide such soluble mixed esters which will form films having this super-flexibility, either without or with the presence of plastifying substances of low volatility, such as are used in ordinary nitrocellulose or acetyl cellulose films. A still further object is to provide such esters from which can be formed films and filaments, the flexibility of which is, in practice, independent of moisture and dryness. Another object of the invention is to provide such esters which can be formed into flexible, transparent, waterproof, strong, hard and relatively slow-burning films suitable as supports in motion picture and other photographic films.

We have succeeded in preparing a new series of mixed esters which enable the above objects to be attained. In these esters for every 24 carbon atoms in the cellulose there are less than 4 (but at least one-third of one) acyl groups selected from the higher fatty acids having more than 8 carbon atoms; and there are also enough acyl groups selected from the lower fatty acids having more than 1 and less than 5 carbon atoms to make said esters soluble in acetone and insoluble in benzol. They may conveniently be indicated by the following general formula:

S represents acyl groups corresponding to fatty acids having more than 8 carbon atoms, such as pelargonic, capric, lauric, myristic, palmitic, and stearic. R represents acyl groups corresponding to fatty acids having more than 1 and less than 5 carbon atoms, such as acetic, propionic, and butyric. In the above formula $m$ is always less than 4, but at least $1/3$ of one, while $n$ is usually more than 8 and less than $11\tfrac{2}{3}$. The S groups may either all be alike or consist of a composite of several groups each corresponding to a different higher fatty acid. For example, the S groups may all be stearyl groups, or some of them may be stearyl groups and some palmityl groups. Similarly the R groups may all be alike or the different R groups may correspond to different lower fatty acids. Because of their commercial availability, we prefer to have the S groups selected from the stearyl or palmityl, and to use acetyl groups alone for the R groups. For example, cellulose aceto-stearate, and aceto-palmitate, or aceto-palmito-stearate having approximately three stearyl or palmityl or stearyl plus palmityl groups and 9 acetyl groups for every 24 carbon atoms in the cellulose group, are the best examples of our esters and exhibit fully their unique properties, including remarkable flexibility when made into films. It will thus be seen that we prefer to have the sum of $m$ and $n$ approximately equal to 12.

When the relative proportions of the groups are altered beyond the limits given above, the properties of these esters startlingly change. For example, if $m$ be increased to 4 or more in the formula given above, the resulting mixed ester becomes soluble in benzol instead of insoluble. Along with this change in solubility, the strength, hardness and other qualities of films made from the esters become relatively much poorer, the benzol soluble esters, with the higher fatty acid groups, being relatively soft and weak.

For example, the properties of some mixed esters outside of our range of proportions have been described elsewhere. In British Patent No. 219,926, Societe de Stearinerie, etc., accepted November 13th, 1924, it is stated that a mixed cellulose ester, containing acetyl groups and one or more high fatty acid groups for each 6 carbon atoms in the cellulose group (4 or 8 high fatty acid groups for each 24 carbon atoms in the cellulose) is soluble in benzol. This agrees also with Gault and Ehrmann's statement in Bulletin de la Societe Chemique de France, vol. 39, June 1926, page 882, that the aromatic hydrocarbons are the best solvents of lauro-diacetocellulose and of palmito-diaceto-cellulose, which are insoluble in acetone. This agrees with our investigations. But the same chemists, in page 883 of the same citation, erroneously thought this benzol solubility to be a characteristic of all mixed esters of the high fatty acids. Nor did earlier investigators indicate to the contrary. The mixed ester described in German Patent No. 112,817, Guido Henkel-Donnersmark, July 17th, 1900, and the corresponding (but less complete) U. S. Patent No. 632,605, Weber and Cross, September 5th, 1899, is the aceto-butyrate containing no groups corresponding to the high fatty acids of over 8 carbon atoms. But Gault and Ehrmann, in pages 874 and 881 of their article cited above, point to said German patent (page 2, column 2) as showing a process which might yield a cellulose acetopalmitate of uncertain composition. The patentee called the product a plain palmitate and did not mention its properties. Upon repetition of this process, it did not give any mixed esters having the properties or proportions of ours.

When, on the other hand, the proportion of higher fatty acyl groups, instead of being increased above 4, drops below one-third of one group for every 24 carbon atoms in the cellulose, the valuable properties of acetone solubility and flexibility, even in dry atmospheres, are likewise lost. Where there is less than one-third of a stearyl group, for example, and there are more than 11⅔ acetyl groups for each 24 carbon atoms in the cellulose, the product is chloroform soluble, acetone-insoluble and closely resembles the well known unhydrolyzed fully esterified cellulose acetate.

Our new esters may be prepared in several ways. The high and low acyl groups may be introduced into the ester one after the other in successive steps, or simultaneously in one step. We prefer a one-step process, because it is quicker and more economical and provides adequate control. While we shall give several examples by way of illustration, it will be understood that our invention is not limited to the details thus given, except as indicated in the appended claims.

In preparing our esters, we can utilize cellulosic materials from any of the sources customarily used in the manufacture of high-grade esters, such as the cotton fiber tissue paper, clean cotton fibers, surgical cotton wool, and even sulfite wood pulp, preferably bleached. These materials, especially the cotton materials, are undegraded when they enter our process and yield esters which are likewise substantially unimpaired or undegraded, as evidenced by the flexibility of films, prepared from them. While we prefer to use materials having the minimum preliminary degradation, we, nevertheless, can make useful mixed organic esters of our new type from cellulosic materials which have been chemically pretreated to form so-called hydrocellulose, (oxycellulose) and reverted cellulose, such as from the viscose or cupramonium processes.

In one example of our invention a bath is prepared by mixing 50 parts by weight of monochloracetic anhydrid with 30 parts by weight of commercial stearic acid and 6 parts by weight of acetic acid. There is also mixed into this bath .05 parts by weight of magnesium perchlorate as a catalyst. This bath is brought to a temperature between 60 to 65° C. and into it is mixed, either before or after it is brought up to this temperature, 4 parts by weight of the cellulosic material, say clean cotton fibers, or cotton tissue paper, as mentioned above. The treatment is kept up at a temperature between 60 to 65° C. until a disappearance of the cotton fibers and homogeneity of the reaction mixture occurs. This varies somewhat, but we have obtained this result in about 7 hours under the conditions stated. The completed ester may be obtained from the reaction mass by any usual or preferred practice. For example, the bath may be poured with stirring into warm methyl alcohol, or any other solvent of the fatty acids, which is not a solvent of the product. The precipitate thus obtained is preferably washed with warmed methyl alcohol to purify it from the other ingredients of the reaction mass. The precipitate thus obtained is substantially wholly soluble in acetone and insoluble in benzol. Analysis shows presence of 40% of stearyl and palmityl groups and about 22% of acetyl groups.

In another example of our invention a bath is prepared by mixing 300 parts by weight of chloracetic anhydrid, 100 parts by weight of chloracetic acid, 185 parts by weight of stearic acid, 35 parts by weight of acetic acid and 0.5 parts by weight of magnesium perchlorate. Into this is stirred 25 parts by weight of cellulose, such as clean cotton wool or bleached cotton tissue paper, and the reaction mixture kept for about 8 hours at 60 to 65° C. A clear dope is thus obtained and the mixed cellulose ester is separated and purified, as indicated hereinabove. The mixed ester, thus obtained, is soluble in acetone and insoluble in benzene. Like the mixed ester obtained in the preceding example, its acetone solutions can be formed into films which are colorless, transparent, hard, and of very high flexibility, even without the addition of plastifying substances. They also retain this flexibility when plastifying substances, such as triphenyl phosphate and the other well known plastifiers used in the cellulose acetate art are employed in the proportions which prevail in that art. This superflexibility is substantially independent of atmospheric dryness or moisture.

In a still further example, 20 parts by weight of chloracetic anhydrid, 30 parts by weight of chloracetic acid, 7 parts by weight of stearic acid and 3 parts by weight of acetic anhydrid are mixed into a bath along with 0.1 part by weight of magnesium perchlorate. Into this is stirred 4 parts by weight of the cellulosic material, such as purified cotton wool. This reaction mass is maintained at 60 to 65° C. until a clear dope is obtained, say about 5 hours. This is precipitated in methyl alcohol, and washed with warmed methyl alcohol and dried, as hereinabove described in the other examples. The product is substantially all soluble in acetone and insoluble in benzol and has the same useful film-forming properties as those described above.

The above examples employ the process of using an anhydrid which impels esterification, without itself furnishing groups to the ester, this being claimed in our copending application of even date herewith entitled "Process of making cellulose esters of organic acids", Serial No. 179,177.

But our new mixed esters may also be prepared in a single step by using an anhydrid of a lower fatty acid, which not only contributes groups to the ester, but also impels esterification by the higher fatty acids, this being claimed in our copending application of even date herewith entitled "Process of making organic esters of cellulose containing acyl groups having more than two carbon atoms", Serial No. 179,176. In one example, 15 parts by weight of acetic anhydrid are mixed with 15 parts by weight of either lauric, myristic, palmitic, or stearic acids or mixtures of them (commercial stearic acid being a mixture of palmitic and stearic acids in roughly equal proportions). As a catalyst we add magnesium perchlorate, say 0.05 parts by weight. Moreover, we prefer to have present a strong solvent for the higher fatty acids, such as chloracetic acid, say for instance 25 parts by weight. Into this reaction bath there is mixed 5 parts by weight of cellulose, such as the cotton tissue paper mentioned above. The mass is kept at 60 to 65° C. until it appears homogeneous, the fibers disappearing. The time for accomplishing this varies, being longest with stearic acid, and shortest with lauric acid and may range from about 3 hours up to 24 hours, for instance. The ester is separated, by precipitating the reaction mixture with methyl alcohol, purification being obtained by washing with methyl alcohol, as above explained. The product is soluble in acetone and insoluble in chloroform, and has good film-forming properties.

While we prefer to prepare our new mixed esters in single step processes, nevertheless, they can be prepared by first forming an ester containing the requisite number of groups of one of the acids, and then introducing the other acid groups. For example, a hydrolyzed cellulose acetate, containing, say 9 or 10 acetyl groups for each 24 carbon atoms in the cellulose, is mixed into a bath of the type indicated above, say 60 parts by weight of monochloracetic acid, 15 parts by weight of stearic acid and 0.05 parts by weight of magnesium perchlorate. 2 parts by weight of said acetate can be treated in this bath and the reaction carried on at 60 to 65° C. until the stearyl groups, say approximately 3 or 2 of them, are introduced.

The following example yields an acetostearate, the proportions of which come very close to the border line at which benzol insolubility ceases. 25 parts by weight of commercial stearic acid, containing roughly equal quantities of stearic and palmitic acid, is mixed with 15 parts by weight of acetic anhydrid, 40 parts by weight of chloracetic acid and 0.05 parts by weight of megnesium perchlorate. Into this bath, warmed to 60° C. is stirred 5 parts of tissue paper of the kind mentioned above. The reaction is carried on between 60 and 65° C. until a clear dope results. This usually happens in about 5 hours. The product is isolated by pouring into methyl alcohol and washing with warmed methyl alcohol. The content of palmityl and stearyl group is found, upon analysis, to be 7%, which is slightly more than the limit of one-third of a group based upon 24 carbon atoms in the cellulose. The product is soluble in acetone.

The analysis or organic esters of cellulose has presented great difficulties, and different methods have given different results in the past. It is, therefore, important to give the method of analysis by means of which the proportions hereinabove mentioned have been determined. It has been especially troublesome to analyze mixed organic esters of cellulose in order to determine the proportion of the higher fatty acids. We have finally worked out the following method as the most accurate.

An accurately weighed sample, say one gram, of the mixed ester, is boiled under refluxing conditions for 24 hours with a mixture of 50 grams of potassium hydroxid and 50 grams of ethyl alcohol. To the resulting mixture there is added 100 cc. of distilled water and the mixture then evaporated to dryness on the water bath. To the residue there is then added 100 cc. more of distilled water, and the mixture again evaporated to dryness on the water bath. The product of these operations, which is now free from alcohol, is dissolved in 200 cc. of distilled water and acidified with a solution of 50 grams of sulfuric acid in 100 cc. of water, and the resulting mixture boiled under refluxing conditions for 5 minutes. It is then cooled to approximately room temperature, mixed with 100 cc. of ethyl ether and then filtered. The residue on the filter is washed with 100 cc. of ethyl ether in several successive portions. The filtrate is separated. The ethereal solution is shaken with three successive portions of water, each consisting of 50 cc., then dried by standing over one to two grams of anhydrous sodium sulfate and then filtered. The bulk of the ether is then removed by distillation and the residue washed into a weighed dish and evaporated as completely as possible on the steam bath. It is finally heated for 2 hours in an oven at 100 to 105° C. The weight of the residue gives the amount of combined higher fatty acid in the sample. From this the weight of the corresponding acyl group can be readily calculated from the molecular weights.

Our novel mixed esters may be mixed with other cellulose esters which are soluble in acetone, such as cellulose acetate and/or cellulose nitrate, either with or without plasticizers. Thus films may be prepared from such mixtures. Layers of our novel mixed esters may likewise be combined with layers of other cellulose esters or ethers in laminated films or other products, a common solvent being present to promote the union, in accordance with customary laminating practice For example, a film or layer of our acetone-soluble mixed esters may be united to a layer of acetone-soluble cellulose acetate, or a layer of nitrocellulose by the use of a cement containing acetone, or a laminated structure may be made by providing a layer of one of these compounds, and flowing or varnishing a layer of the other upon it while in a solution containing a sufficient amount of solvent, such as acetone, to promote the adhesion. For example, a film of our superflexible aceto-palmito-stearate of cellulose may have a very thin antistatic layer of relatively more hygroscopic cellulose acetate on the back, and said cellulose acetate may contain hygroscopic or electrolytic substances, as is well known in the art of manufacturing photographic films.

In plastic compositions, or flowable film-forming compositions, or coating compositions in which our novel mixed organic esters form an essential constituent, there may also be present any of the substances of low volatility commonly colloidized with cellulose acetate in its known compositions, a suitable amount of a common solvent, such as acetone, being present. Moreover, the proportions may be the same as those heretofore employed in connection with cellulose acetate. For example, film-forming compositions may be prepared by dissolving 1 part by weight of our aceto-palmito-stearate of cellulose in 5 to 12 parts by weight of acetone along with 0.2 to 0.5 parts by weight of tricresyl or triphenyl phosphate. From such solutions colloidized films may be prepared in the usual way having the desired qualities as supports in motion picture films and in addition having a flexibility of twice that of the usual cellulose acetate and cellulose nitrate films of the same thickness when tested under parallel conditions in a standard Schopper fold-testing machine It is also a feature of our mixed organic esters of cellulose that they form transparent, waterproof, strong, hard films of low inflammability and of very high and durable flexibility from simple solutions in a volatile solvent without any other plasticizers or substances of low volatility, commonly called "softeners." For example, an acetone solution of a mixed cellulose ester in which the palmityl and stearyl groups total 3, and the acetyl groups total approximately 9 for every 24 carbon atoms in the cellulose, may be adjusted by regulating the relative proportion of ester to acetone until it has approximately the honey-like viscosity customarily employed in modern film-making apparatus. It then may be spread and colloidized films formed therefrom, in the conventional way, which films have far greater flexibility than ordinary cellulose acetate and nitrocellulose films, in spite of the absence of a "high boiler" from them. Moreover, they are practically independent of changes in atmospheric humidity, which strongly affects the strength and flexibility of cellulose acetate films. Being transparent, strong, hard and of low inflammability, they form excellent supports for photographic emulsions Our novel mixed esters may be used in making moldable plastic compositions, in varnishes and lacquers, in artificial leather, as a coating for fabrics, in rayon, and in fact all of the ways in which organic cellulose esters have been hitherto employed; but by reason of the special properties hereinabove enumerated, they are particularly advantageous.

Having thus described our invention, what we claim as new and desire to secure by Letters Patent is:

1. A mixed organic ester of cellulose, which is soluble in acetone and insoluble in benzol, said ester containing, for every 24 carbon atoms in the cellulose group, less than 4 but more than one-third of one acyl groups selected from the higher fatty acids having more than 8 carbon atoms, the remaining acyl groups being selected from the lower fatty acids having more than 1 and less than 5 carbon atoms.

2. A mixed organic ester of cellulose, which is soluble in acetone and insoluble in benzol, said ester containing, for every 24 carbon atoms in the cellulose group, less than 4 but more than one-third of one acyl groups selected from the higher fatty acids having more than 8 carbon atoms, the remaining groups being acetyl groups.

3. A mixed organic ester of cellulose, which is soluble in acetone and insoluble in benzol, said ester containing, for every 24 carbon atoms in the cellulose group, less than 4 but more than one-third of one acyl groups selected from the group of lauric, myristic, palmitic and stearic acids, and more than 8 but less than 11⅔ acyl groups selected from the lower fatty acids having more than 1 and less than 5 carbon atoms.

4. A mixed organic ester of cellulose, which is soluble in acetone and insoluble in benzol, said ester containing, for every 24 carbon atoms in the cellulose group, less than 4 but more than one-third of one acyl groups selected from the group of lauric, myristic, palmitic and stearic acids, and more than 8 but less than 11⅔ acetyl groups.

5. A mixed organic ester of cellulose, which is soluble in acetone and insoluble in benzol, and forms superflexible films from its solution in acetone, said ester containing stearyl and palmityl groups totalling approximately 3 for every 24 carbon atoms in the cellulose group, the remaining acid groups being approximately 9 acetyl groups.

Signed at Rochester, New York this 23rd day of March, 1927.

HANS T. CLARKE.
CARL J. MALM.